United States Patent
Morino et al.

(10) Patent No.: US 7,963,161 B2
(45) Date of Patent: Jun. 21, 2011

(54) HEATING RESISTOR TYPE AIR FLOW RATE MEASURING DEVICE UTILIZING AN AUXILIARY PASSAGE

(75) Inventors: Takeshi Morino, Hitachinaka (JP); Yuki Okamoto, Hitachinaka (JP); Naoki Saito, Tokai (JP); Hiroshi Hirayama, Hitachinaka (JP); Takahiro Miki, Bolton (GB)

(73) Assignee: Hitachi, Ltd., Tokyo (JP)

( * ) Notice: Subject to any disclaimer, the term of this patent is extended or adjusted under 35 U.S.C. 154(b) by 42 days.

(21) Appl. No.: 12/261,862

(22) Filed: Oct. 30, 2008

(65) Prior Publication Data

US 2009/0173151 A1 Jul. 9, 2009

(30) Foreign Application Priority Data

Oct. 31, 2007 (JP) ................. 2007-282603

(51) Int. Cl.
*G01F 1/68* (2006.01)
(52) U.S. Cl. .................. 73/202.5; 73/204.26
(58) Field of Classification Search .......... None
See application file for complete search history.

(56) References Cited

U.S. PATENT DOCUMENTS

| | | | |
|---|---|---|---|
| 6,332,356 B1 | 12/2001 | Hecht et al. | |
| 6,571,621 B2 * | 6/2003 | Watanabe et al. | 73/202.5 |
| 6,694,810 B2 * | 2/2004 | Ueyama et al. | 73/204.22 |
| 7,360,414 B2 * | 4/2008 | Konzelmann et al. | 73/202.5 |

FOREIGN PATENT DOCUMENTS

| | | |
|---|---|---|
| EP | 0 369 592 A2 | 5/1990 |
| EP | 1 236 975 A2 | 9/2002 |
| EP | 1 321 747 A2 | 6/2003 |
| JP | 2002-506528 | 2/2002 |
| WO | WO 99/53274 | 10/1999 |

OTHER PUBLICATIONS

European Search Report dated Mar. 17, 2009 (Four (4) pages).

* cited by examiner

*Primary Examiner* — Harshad Patel
(74) *Attorney, Agent, or Firm* — Crowell & Moring LLP

(57) ABSTRACT

An object of the present invention is to provide a structure which prevents a particulate contaminant and a liquid contaminant on which centrifugal separation hardly works, from arriving at a sensor element part. In order to attain the above described object, in a heat resistor type air flow rate measuring device which includes an auxiliary passage taking in a part of a fluid flowing in a main passage, and a plate-shaped sensor element installed in the aforesaid auxiliary passage and for detecting a flow rate of the fluid, and is a heat resistor type flow rate measuring device having an auxiliary passage formed along a curved line at 90° or more in an auxiliary passage portion at an upstream side from the plate-shaped sensor element, the aforesaid auxiliary passage is formed along a curved line at 90° or more on a phantom plane orthogonal to a sensor formation surface of the plate-shaped sensor element and parallel with a flow, and a sensor formation surface side and a rear side of the plate-shaped sensor element have gaps from an auxiliary passage wall surface.

9 Claims, 6 Drawing Sheets

HEATING RESISTOR TYPE AIR FLOW RATE MEASURING DEVICE UTILIZING AN AUXILIARY PASSAGE

BACKGROUND OF THE INVENTION

1. Field of the Invention

The present invention relates to an air flow meter for measuring an air flow rate, and particularly relates to a heating resistor type air flow rate measuring device which is preferable for measurement of an intake air flow rate of an internal combustion engine of an automobile.

2. Background Art

Conventionally, heat resistor type air flow rate measuring devices are mounted in intake pipes of an automobile, a motorcycle and the like, detect intake air amounts, and send signals of them to ECU (Engine Control Unit).

When a contaminant such as exhaust gas which is emitted from an engine or other vehicles is taken into an intake pipe, the heat resistor of a heat resistor type air flow rate measuring device is contaminated by the contaminant. Further, when the intake pipe takes in water droplets or the like which are raised by a vehicle traveling ahead during drive in the rain or the like, the water droplets or the like adhere to the air cleaner element, and are further taken into the intake pipe, and the water drops comes flying to the heat resistor of the heat resistor type air flow rate measuring device. When the heat resistor is contaminated, the heat conductivity of the surface of the heat resistor changes, and differs in the heat radiation characteristic from the initial state (at the time of shipment), whereby even if the same flow rate contacts the heat resistor, the output value differs from the output value in the initial state, and an error occurs. When water droplets come flying, and the water droplets adhere to the heat resistor, the output waveform becomes spike-shaped due to the heat of vaporization, and correct output cannot be obtained until the water droplets disappear from the sensor element by being vaporized or passing it.

As the countermeasure against this, JP Patent Publication (Kohyo) No. 2002-506528 describes the device in which an auxiliary passage shape at the upstream side of the heat resistor which is to be a sensing part is made a detoured shape or spiral shape. In the device, when a contaminant or a water droplet comes flying from the upstream side of the air flow meter, the contaminant or the water droplet is separated from clean air by the centrifugal force which is brought about by the auxiliary passage shape in the detoured or spiral shape to avoid the heat resistor in the auxiliary passage.

SUMMARY OF THE INVENTION

However, it is actually difficult to protect the heat resistor from a contaminant with only the shape of the auxiliary passage. Particle which is low in density such as carbon reaches the heat resistor since the centrifugal force to the particle does not sufficiently work. Further, once a contaminant in the liquid form such as a water droplet adheres to the inner wall surface of the auxiliary passage, it moves in the auxiliary passage at such a slow speed that the centrifugal force does not work, passes through the support part or the like of the heat resistor and is likely to reach the heat resistor.

An object of the present invention is to provide a structure which prevents a particulate contaminant and a liquid contaminant on which the centrifugal separation hardly works from arriving at a sensor element part.

In order to attain the above-described object, a heat resistor type air flow rate measuring device according to the present invention is a heat resistor type air flow rate measuring device which includes an auxiliary passage taking in a part of a fluid flowing in a main passage, and a plate-shaped sensor element for detecting a flow rate of the fluid which is installed in the auxiliary passage and is a heat resistor type air flow rate measuring device having the auxiliary passage formed along a curved line at 90° or more in an auxiliary passage portion at an upstream side from the plate-shaped sensor element, in which the auxiliary passage is formed along a curved line at 90° or more on a phantom plane orthogonal to a sensor formation surface of the plate-shaped sensor element and parallel with a flow, and a sensor formation surface side and a rear side of the plate-shaped sensor element have gaps from an auxiliary passage wall surface.

In this case, a passage ranging to an upstream from a downstream of the plate-shaped sensor element preferably has a curve of 360 degrees or more.

Further, work for attenuating surface tension is preferably applied to a side wall surface of the auxiliary passage to suppress scattering of water by water repellence and to reduce a moving speed of the water.

The heat resistor type air flow rate measuring device according to the present invention can make it difficult for contaminants in a dust form and a liquid form which enter the intake pipe to reach the sensor element, and can reduce deterioration of the sensor element by contamination as compared with the conventional centrifugal separation type.

The present specification encompasses the content of the specification of Japanese Patent Application No. 2007-282603 on which the priority of the present application is based.

DETAILED DESCRIPTION OF THE PREFERRED EMBODIMENTS

In a heat resistor type air flow rate measuring device which will be described below, in the heat resistor type air flow rate measuring device including an auxiliary passage taking in a fluid flowing in a main passage, a sensor element installed in the auxiliary passage and detecting a flow rate of the fluid, and a support portion provided for installing the sensor element in the auxiliary passage, the sensor element and the support part are disposed halfway in a curve of the auxiliary passage so that a plane in which the curve is formed, and the sensor element and the support portion intersect substantially perpendicularly, and the sensor element is disposed on the support portion, while a flow rate detecting part of the sensor element faces an outer peripheral side or an inner peripheral side of the curve. Preferably, the flow rate detecting part of the sensor element is faced to the outer peripheral side of the curve. Further, by configuring a two-dimensional and threedimensional curved line portions in the auxiliary passage at an upstream part and a downstream part of the curve in the vicinity of the sensor element, the sensor element is disposed so as not to be directly seen from the opening of an inlet port and the opening of an outlet port.

Hereinafter, an embodiment of the present invention will be described in detail with reference to the accompanying drawings. FIGS. 1 to 4 show one embodiment of a heat resistor type air flow meter according to the present invention.

Figure 1:
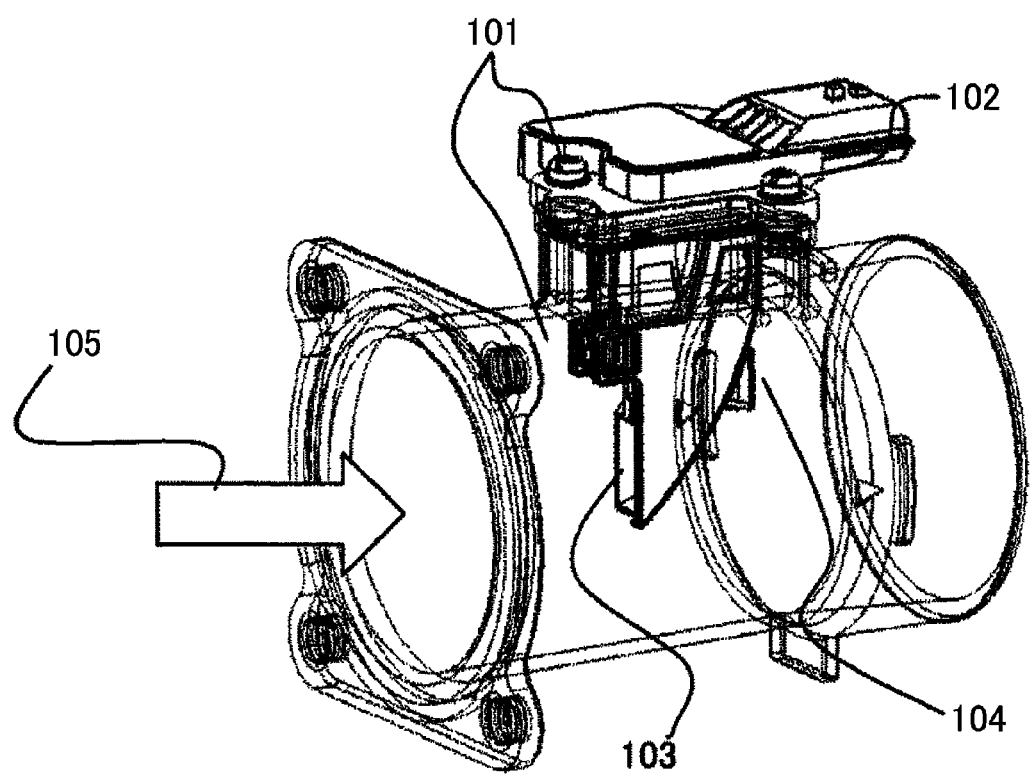
FIG. 1 is a general view according to one embodiment of the present invention.

A heat resistor type air flow rate measuring device according to the present invention is fixed to an intake pipe 101 with a screw 102 as shown in FIG. 1. A main flow passing inside the intake pipe is in the direction shown by an arrow 105, and an auxiliary passage inlet port 103 and an auxiliary passage outlet port 104 are disposed in the intake pipe 101. FIG. 1 shows the state in which the heat resistor type air flow rate measuring device in the intake pipe 101 is seen through.

Figure 2:
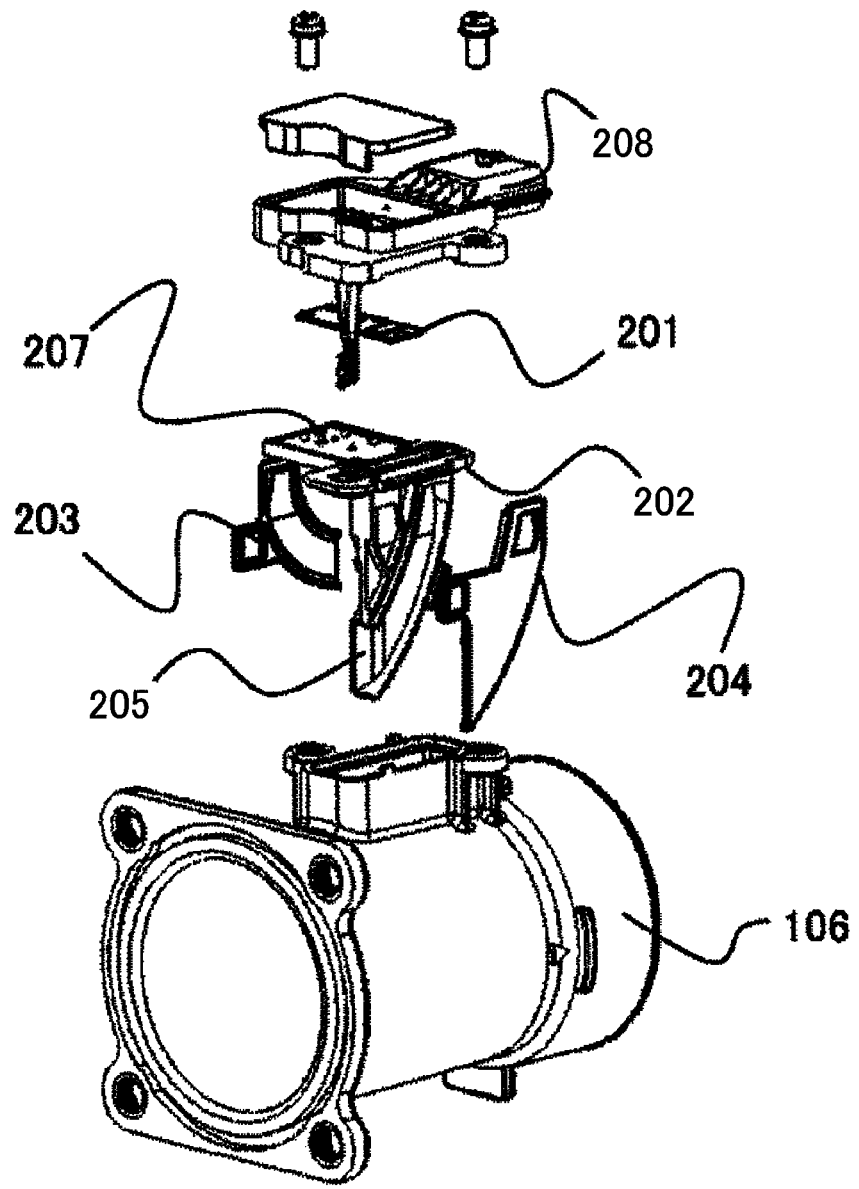
FIG. 2 is an assembly diagram according to one embodiment of the present invention.

An assembly diagram is shown in FIG. 2. The auxiliary passage is constituted of a left side cover 203, a flange base 202, a right side cover 204, and a housing sub-assembly 205. The left side cover 203 and the flange base 202, and the right side cover 204, the housing subassembly 205 and the flange base 202 are connected to one another with bonding, welding or the like, and a space surrounded by the four components forms the auxiliary passage. The flange base 202 is provided with a plane (circuit board mounting surface) 207 on which a circuit board 201 with a circuit component, a sensor element and a support integrated can be mounted. By mounting the circuit board 201 on the plane 207, a sensor element mounting part of the circuit board 201 can be mounted in the auxiliary passage so that a mounting surface (see FIG. 3) of a sensor element 303 in the circuit board 201 becomes substantially perpendicular to a phantom plane 401 (see FIG. 4) on which a curve (curved line) of the auxiliary passage is drawn. The circuit board 201 is electrically connected to a connector 208 configured at the housing sub-assembly 205 by aluminum wire bonding, receives supply of a power source from here, and outputs an output signal.

Figure 3:
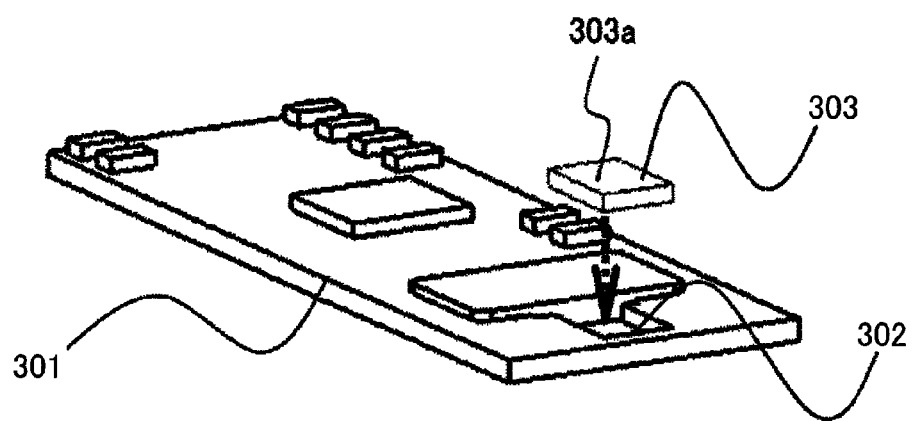
FIG. 3 is a perspective view of a circuit board of the present invention.

FIG. 3 shows the circuit board. A board 301 is provided with a recess 302, and the sensor element 303 is mounted in the recess 302. The sensor element 303 is configured by a plurality of resistors (resistor pattern) formed by thin films on a support in a thin sheet form in addition to the heat resistor. Accordingly, the sensor element 303 itself is in a thin sheet form, and configures a plate-shaped sensor element. As a result that the sensor element mounting part of the circuit board 201 is mounted in the auxiliary passage as described above, the sensor element 303 is disposed in the auxiliary passage so that a support surface 303a (also called a resistor pattern formation surface or a sensor formation surface of the plate-shaped sensor element) on which the resistor pattern is formed becomes substantially perpendicular to the phantom plane 401 (see FIG. 4).

Figure 4:
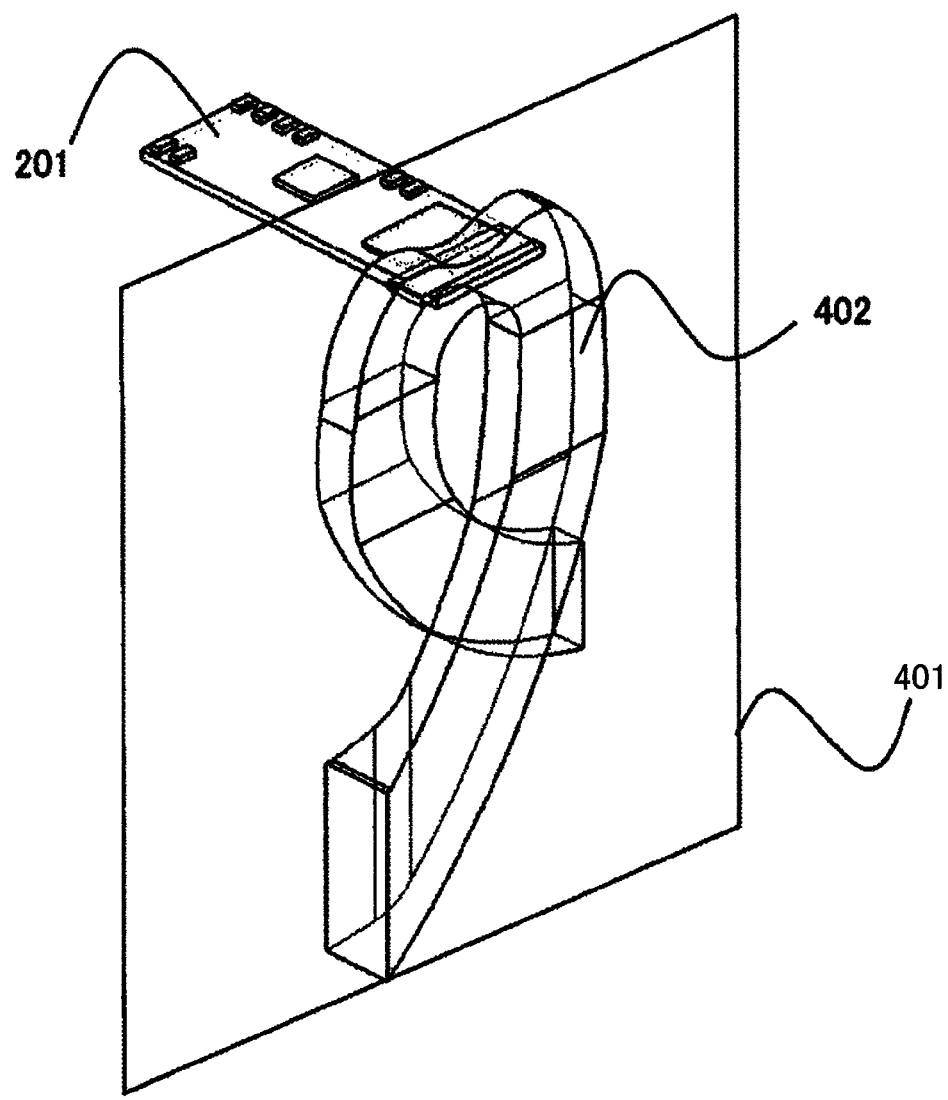
FIG. 4 is a view showing the positional relationship of an auxiliary passage and the circuit board according to the embodiment of the present invention.

The positional relationship of an auxiliary passage 402 surrounded by the above described component housing sub-assembly 205, the flange base 202, the left side cover 203 and the right side cover 204, and the circuit board 201 is shown in FIG. 4.

As described above, the circuit board 201 is mounted so as to intersect the phantom plane 401 substantially perpendicularly. Here, "substantially perpendicular" means being mounted to intersect practically perpendicularly, and the circuit board 201 may have an angle in the range of about ±10° from the perpendicular state due to mounting tolerance, another purpose or the like. Further, the plate-shaped sensor element 303 is mounted so that the surface on which the sensor element is mounted faces along the flow of the air in the auxiliary passage (essentially parallel with the flow). Therefore, the resistor pattern formation surface of the sensor element 303 faces the outer peripheral side or the inner peripheral side of the auxiliary passage which is formed into a curved line shape.

The phantom plane 401 is assumed to be a plane on which a curve (curved line) at 90° or more which the auxiliary passage 402 has is drawn.

By intersecting the plane on which the curve of the auxiliary passage is drawn, and the resistor pattern formation surface in the support substantially perpendicularly, the circuit part can be placed outside the intake pipe. Therefore, when the auxiliary passage is designed with the same passage length, the effective sectional area which projects in the intake pipe can be made small, which is advantageous from the viewpoint of pressure loss.

Further, when the auxiliary passage is designed with the same effective sectional area, all the projected portion into the intake pipe can be configured as the auxiliary passage, and therefore, the upstream side auxiliary passage and the downstream side auxiliary passage from the sensor element can be formed with gradual curves. Therefore, separation hardly occurs in the flow of the intake air inside the auxiliary passage, and sensor output can be stabilized. As a result that separation hardly occurs, the air-flow resistance in the auxiliary passage decreases, and flow velocity in the auxiliary passage becomes high, which contributes to increase in the low flow rate sensitivity of the sensor output.

Figure 5:
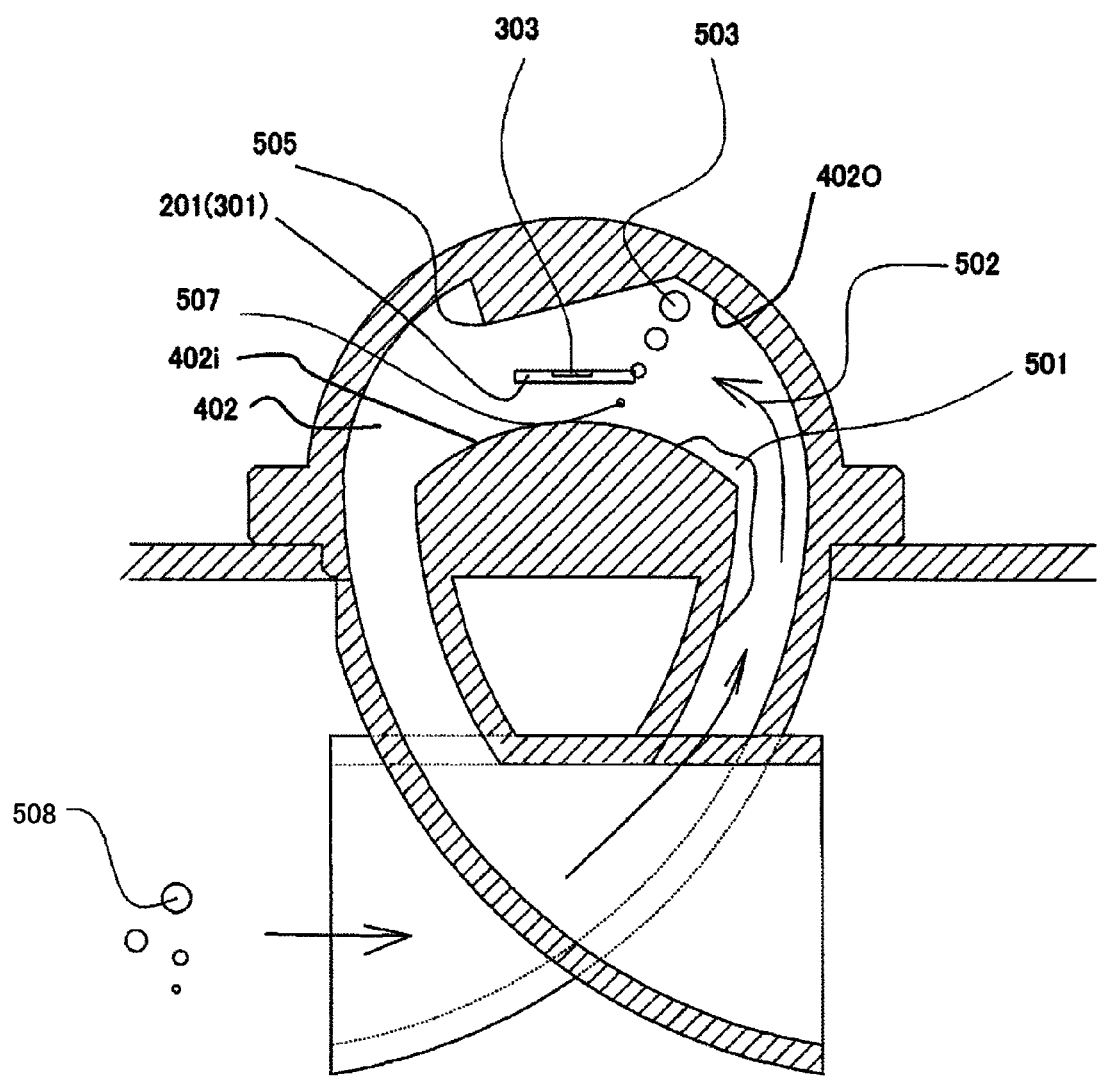
FIG. 5 is a sectional view of the auxiliary passage according to the embodiment of the present invention.

The characteristics of the embodiment will be described by using FIG. 5. FIG. 5 shows the section of the auxiliary passage 402 of FIG. 4. As shown in FIG. 5, the heat resistor type air flow rate measuring device of the present embodiment has the auxiliary passage which is formed the curved line at 90° or more (the direction of the flow changes by 90° or more) at the upstream side from the plate-shaped sensor element 303. Dust (508) such as silica sand and carbon, and a water droplet (508) which come flying from the upstream side enter the auxiliary passage 402 from the inflow opening in various states though they are within certain ranges of the masses and particle sizes. A centrifugal force (502) works at the curved line portion at the upstream side of the plate-shaped sensor element 303. At this time, the centrifugal force F which works on a matter which has come flying such as dust or a water droplet is $$F = m \cdot a = \rho \cdot ((4 \cdot \pi \cdot (d/2)^3)/(3 \cdot r)) \cdot v^2 \quad \text{(Formula 1)}$$

(ρ; density of the dust or the like, d; diameter of the dust or the like, r; R of the curved passage, v; velocity of entry into the curved passage),
and therefore, the heavier dust (503), the dust with the larger particle size is distributed to the outer peripheral side (an outer peripheral wall surface 402o side) of the curved passage in the portion just before the plate-shaped sensor element. The plate-shaped sensor element 303 is mounted so as to intersect the curved passage perpendicularly, and is mounted inside the curved passage as 201 in FIG. 5, whereby the particle size of the dust or the like which adheres to the element can be suppressed to the minimum. The resistor pattern formation surface side and the rear side of the plate-shaped sensor element 303 have gaps from the auxiliary passage wall surface.

Here, a water droplet which comes flying is also considered. Once a water droplet adheres to the wall surface, it stays there to merge a water droplet 501 which comes flying later to grow to a certain mass, directly passes along the wall surface to reach the plate-shaped sensor element part 303. In order to avoid this, it is necessary to separate the inner peripheral wall surface 402*i* and the plate-shaped sensor element 303 at a certain distance. Here, if the distance between the inner peripheral wall surface 402*i* and the plate-shaped sensor element 303 increases, the particle size of the dust which reaches the plate-shaped sensor element 303 becomes large as described above. Therefore, optimization is necessary.

Due to the shape of the auxiliary passage, when water droplets which fly inside the main passage enter the auxiliary passage 402, most of the water droplets adhere to the inner wall of the auxiliary passage 402 once, before reaching the sensor element 303. Since the water droplets which once adhere to the wall surface are sufficiently slow in the traveling speed as compared with the flow of the air inside the auxiliary passage 402, most of the water droplets are attracted to the inner peripheral side of the curve (the inner peripheral wall surface 402*i* side) where the flow velocity is higher, and the water droplets do not reach the sensor element 303. In this case, the resistor pattern formation surface of the sensor element 303 is preferably disposed to face the outer peripheral side (the outer peripheral wall surface 402*o* side).

Further, microscopic carbon particles and the like on which the centrifugal force does not sufficiently work pass the inner periphery of the curve (near the inner peripheral wall surface 402*i*) in the vicinity of the sensor element 303 as the above described water droplets, and therefore, they hardly reach the sensor element 303.

The particles which are conventionally separated by the centrifugal force pass the outer peripheral side of the curve (near the outer peripheral wall surface 402*o*), and therefore, they do not reach the sensor element 303.

Therefore, in the heat resistor type air flow rate measuring device in the present invention, when the dust and water droplets which enter the intake pipe 106 enter the auxiliary passage 402, light dust or dust with a small particle size which cannot be avoided with the conventional centrifugal separation principle can be avoided from reaching the heat resistor of the sensor element 303.

When the present embodiment is adopted, the space at the upstream side from the plate-shaped sensor element 303 is in the shape which is sandwiched by the circular arc and the plane, and therefore, the area in the vicinity of the plate-shaped sensor element is in an enlarged pipe shape, which is not preferable when stability of the flow is considered. Therefore, a pressure gradient needs to be provided by providing a projection in a wedge shape or the like on the outer peripheral side wall surface in the vicinity of the plate-shaped sensor element 303 as shown by reference numeral 505.

Figure 6:
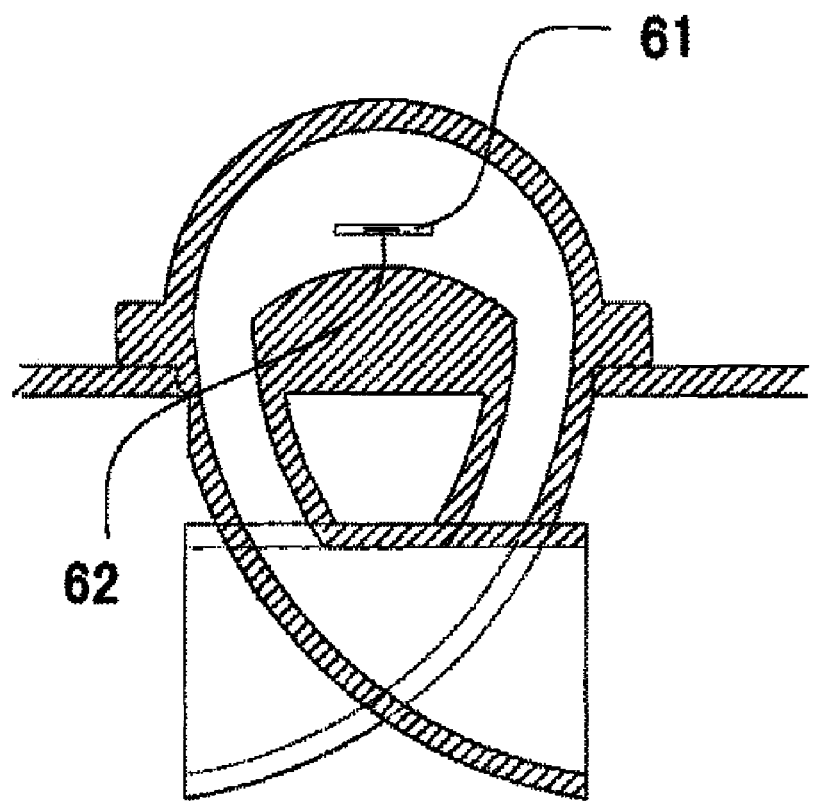
FIG. 6 is a sectional view showing another embodiment of the present invention.

At this time, when the resistor pattern formation surface of the plate-shaped sensor element 303 is faced to the inner peripheral side as shown in FIG. 6, the flow in the vicinity of the plate-shaped sensor element 303 becomes a contraction flow contrary to FIG. 5, and contamination resistance and flow stability can be made compatible.

Further, for example, after the engine stops, the oil inside the crankcase or the oil adhering to the turbine blade or the like becomes vapor, passes inside the intake pipe by diffusion and convection, and reaches the heat resistor type air flow rate measuring part. However, according to the above described auxiliary passage shape, oil vapor is adsorbed to the inner wall of the auxiliary passage before reaching the sensor element, and the amount of the oil reaching the sensor element decreases as compared with the conventional auxiliary passage shape.

In the heat resistor type air flow rate measuring device according to the present invention, the auxiliary passage can be formed by the housing by resin molding, and cost can be reduced.

Embodiments of the present invention have been described in detail above. However, the present invention is not limited to the above described embodiments, and various design modifications can be made to the embodiments as described above to a degree that does not depart from the spirit and scope of the present invention that is described in the claims of the invention.

What is claimed is:

1. A heat resistor type air flow rate measuring device comprising:

an auxiliary passage taking in a part of fluid flowing in a main passage; and a plate-shaped sensor element for detecting a flow rate of the fluid being installed in the auxiliary passage, wherein the auxiliary passage is provided with an auxiliary passage inlet port and an auxiliary passage outlet port disposed in an intake pipe forming said main passage;

the plate-shaped sensor element having a sensor formation surface being mounted on a board provided in the auxiliary passage, the board having the sensor formation surface of the plate-shaped sensor element being arranged so as to intersect a phantom plane substantially perpendicularly, the phantom plane being located parallel to the flow direction in the intake pipe, and the auxiliary passage being arranged along the phantom plane from the inlet port to the outlet port;

the auxiliary passage forms a curved line from the inlet port to the plate-shaped sensor element having a curvature of 90° or more along the phantom plane upstream of the plate-shaped sensor element; and the sensor formation surface and a rear side of the board opposite to the sensor formation surface form gaps from an auxiliary passage wall surface.

2. The heat resistor type air flow rate measuring device according to claim 1, wherein the plate-shaped sensor element is arranged outside of the intake pipe.

3. The heat resistor type air flow rate measuring device according to claim 2, wherein a passage ranging to an upstream from a downstream of the plate-shaped sensor element has a curve of 360° or more.

4. The heat resistor type air flow rate measuring device according to claim 3, wherein a side-wall surface of the auxiliary passage suppresses scattering of water droplets moving within the auxiliary passage and reduces a speed of the water droplets.

5. The heat resistor type air flow rate measuring device according to claim 2, wherein a side-wall surface of the auxiliary passage suppresses scattering of water droplets moving within the auxiliary passage and reduces a speed of the water droplets.

6. The heat resistor type air flow rate measuring device according to claim 1, wherein a passage ranging to an upstream from a downstream of the plate-shaped sensor element has a curve of 360° or more.

7. The heat resistor type air flow rate measuring device according to claim 1, wherein a side-wall surface of the auxiliary passage suppresses scattering of water droplets moving within the auxiliary passage and reduces a speed of the water droplets.

8. The heat resistor type air flow rate measuring device according to claim 6, wherein a side-wall surface of the auxiliary passage suppresses scattering of water droplets moving within the auxiliary passage and reduces a speed of the water droplets.

9. The heat resistor type air flow rate measuring device according to claim 1, wherein the sensor formation surface faces an outer circumferential surface of the auxiliary passage.

* * * * *